United States Patent
Groff

[15] 3,660,220
[45] May 2, 1972

[54] ELECTRICALLY INSULATIVE TAPE

[72] Inventor: Gaylord L. Groff, North St. Paul, Minn.

[73] Assignee: Minnesota Mining and Manufacturing Company, St. Paul, Minn.

[22] Filed: Aug. 26, 1970

[21] Appl. No.: 67,189

Related U.S. Application Data

[63] Continuation of Ser. No. 637,765, May 11, 1967, abandoned.

[52] U.S. Cl. ................................ 161/93, 161/95, 161/163, 161/167, 161/171, 260/18, 260/22
[51] Int. Cl. ....................................................... B32b 17/06
[58] Field of Search ............... 260/18 EP, 22 EP, 2; 161/92, 161/93, 95, 163, 167, 171, 184, 185, 410; 174/121, 121.4

[56] References Cited

UNITED STATES PATENTS

| | | | |
|---|---|---|---|
| 2,909,495 | 10/1959 | Rosenberg | 260/22 EP |
| 2,999,824 | 9/1961 | Singleton | 260/18 EP |
| 3,101,845 | 8/1963 | Heasley | 161/163 |
| 3,254,150 | 5/1966 | Rogers | 161/163 |
| 3,340,212 | 9/1967 | Tomita | 260/22 EP |
| 3,438,909 | 4/1969 | Kleeberg | 260/2 |
| 3,458,389 | 7/1969 | Mertens | 161/171 |

*Primary Examiner*—William J. Van Balen
*Assistant Examiner*—James Joseph Bell
*Attorney*—Kinney, Alexander, Sell, Steldt & Delahunt

[57] ABSTRACT

Electrically insulative tape comprising a base electrically insulative sheet impregnated or coated with a resin composition that includes epoxy resin and an acid-terminated ester reaction product of hydrogenated castor derivative and dicarboxylic acid or anhydride.

9 Claims, 1 Drawing Figure

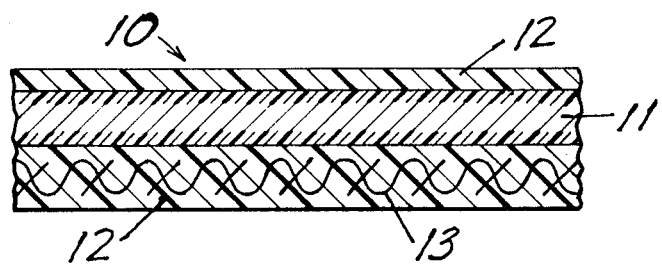

ELECTRICALLY INSULATIVE TAPE

REFERENCE TO RELATED APPLICATION

This application is a continuation of a copending application, Ser. No. 637,765, filed May 11, 1967 and now abandoned.

BACKGROUND OF THE INVENTION

The achievement of certain desired improvements in resin-coated or resin-impregnated electrically insulative tapes requires finding resin compositions that have a special, complex combination of properties. To begin with, a general improvement in the electrical properties under high-temperature conditions of the resin compositions has been sought. More than that, the resistance of the resin compositions to a combination of high-temperature and moisture conditions has needed improvement. High-temperature, moisture-laden environments, such as sometimes exist for electric motors in factories, ships, wells, and so on, have degenerated otherwise quite useful electrically insulative resin compositions, impregnated in tape. These resin compositions have become soft and tacky, and the tape has failed as insulation.

Further, room-temperature physical properties of the tape can be critical to its utility. Two competing properties that the prior art has not successfully achieved together in tapes like those of this invention are, on the one hand, flexibility and suppleness which permit the tape to be properly wound around an article to be insulated, and, on the other hand, nontackiness so that the tape can be readily handled and wound in a roll without a liner. Ordinary epoxy compositions having the needed electrical properties are too brittle when in a nontacky form to be properly wrappable on a workpiece. To compensate for that, the resin composition is left in a tacky form and the tape is wound with a liner, which interferes with application of the tape and increases costs.

SUMMARY OF THE INVENTION

The resin compositions of the present invention have been found to be ideally suited for impregnating or coating electrically insulative sheeting. While rather low in molecular weight and fluid so that they penetrate sheeting well, the resin compositions are nevertheless flexible when fully or partially cured. The resin compositions may be partially cured in the tape product as sold, and especially with the resin compositions in this condition, the tapes are very tough, non-tacky, and handleable. Heat-curable tapes incorporating a thin layer of these resin compositions have been found to have good shelf-life, and yet the resin compositions cure quickly in the final application. The tapes are often wound in a roll without a liner.

Even as a thin layer impregnated in sheeting, the new resin compositions remain resistant to aging under high-temperature or high-moisture conditions, or a combination of both. Further, tapes impregnated with the new resin compositions have quite desirable electrical and mechanical properties, including a lower loss of electric power through dissipation in high-temperature environments than tapes impregnated with prior resin compositions.

The tape of this invention comprises, briefly, self-supporting, flexible, electrically insulative sheeting carrying a thin layer of the new electrically insulative resin composition. The resin compositions comprise (1) an epoxy resin having more than 1.3 oxirane groups on the average per molecule; (2) an acid-terminated ester reaction product of (a) a hydrogenated castor derivative and (b) a dicarboxylic compound selected from dicarboxylic acid anhydrides and dicarboxylic acids; and (3) a catalyst that promotes reaction of the epoxy resin and acid-terminated reaction product. Preferably the resin composition is present in the final tape product in a partially reacted form. Often the tapes of the invention include additional layers of sheeting laminated to the other layers of sheeting by the resin composition, and these laminated constructions have been found to have good handling and insulating characteristics.

DESCRIPTION OF THE EMBODIMENTS

A wide variety of epoxy resins having more than one oxirane group on the average per molecule are useful in the resin compositions of this invention. Practically speaking, useful epoxy resins have on the average more than 1.3, and desirably close to 2 or even more than 2 oxirane groups per molecule. Particularly useful epoxy resins are the polyglycidyl ethers of a polyhydric phenol such as bisphenol A. Also useful are cycloaliphatic epoxy resins such as 3,4-epoxycyclohexylmethyl-3,4-epoxycyclohexanecarboxylate, dicyclopentadiene dioxide, vinylcyclohexene dioxide, and limonene dioxide.

Resin compositions of the invention further include, as an epoxy-reactive component, acid-terminated ester reaction products of hydrogenated castor derivatives and dicarboxylic acids or dicarboxylic acid anhydrides. Hydrogenated castor derivatives, which are generally waxy solids, are prepared through hydrogenation of castor oil, and for some varieties, by further treatment of the hydrogenated castor oil. Castor oil, which is principally the triglyceride of ricinoleic acid, has been more specifically analyzed as including, as its fatty acid moiety, approximately 89.5 percent ricinoleic acid, 3.0 percent oleic acid, 4.2 percent linoleic acid, 1.0 percent stearic acid, 1.0% palmitic acid, 0.7 percent dihydroxy stearic acid, and 0.3 percent linolenic acid, and 0.3 percent eicosanoic acid, and as its polyol moiety, glycerol.

Upon hydrogenation of usually somewhat purified castor oil, at least the unsaturation at the number nine and 10 carbons of ricinoleic acid is modified, and the main constituent of hydrogenated castor oil is glyceryl tris 12-hydroxystearate. Castor oil hydrogenated to several different degrees is available commercially and most of these products are useful in the present invention. In general, hydrogenated castor derivatives in which the unsaturation is eliminated to a degree such that their WIJS iodine number is not more than about 40 or 50, are useful in resin compositions of this invention. When the unsaturation in the castor derivative is much greater than that represented by an iodine number of 40, the resin compositions in thin layers have inferior resistance to aging in a high-temperature environment.

Beside hydrogenated castor oil itself, wax-like hydrogenated castor derivatives based on hydrogenated castor oil are also useful in resin compositions of the invention. In one method of preparation, 12-hydroxystearic acid is first formed from hydrogenated castor oil, and the acid group then esterified. The molecules of these useful derivatives have at least one long fatty acid chain, for the most part saturated, with a hydroxyl group at the number 12 carbon atom, and a functional group, typically a hydroxyl group, at the originally acid end of the stearic acid chain. Such hydrogenated castor derivatives as propylene glycol monohydroxystearate, glyceryl monohydroxystearate, and ethylene glycol monohydroxystearate are examples of those useful in this invention. The term hydrogenated castor derivative is used in this specification to include the above described materials and materials having essentially the same structure.

Both dicarboxylic acids and dicarboxylic acid anhydrides have been found useful for acid-terminating the hydrogenated castor derivatives. Acid termination is accomplished through an ester reaction at the hydroxyl group attached to the number 12 carbon atom of stearic acid portions of the hydrogenated castor derivative molecule, and in the case of such hydrogenated castor derivatives as propylene glycol monohydroxystearate, by an ester reaction at the hydroxyl group of the polyol portion. Examples of useful acids are succinic, sebacic, and phthalic acid; and examples of useful anhydrides are succinic, maleic, phthalic, hexahydrophthalic, and chlorendic anhydride. Anhydrides incorporating an aromatic ring structure are somewhat less preferred since they tend to stiffen the ultimate resin compositions.

To achieve the desired reaction of the dicarboxylic compound and the hydrogenated castor derivative, at least about 1.7 acid equivalent weights of the dicarboxylic compound should be mixed with each hydroxyl equivalent weight of the castor derivative. If less than 1.7 acid equivalent weights of dicarboxylic compound are included, the mixture will tend to gel through a cross-linking reaction of the terminal acid groups then present on the castor derivative and the unreacted hydroxyl groups of the castor derivative. On the other hand, to avoid undesirable epoxy curing reactions in the final resin composition, the number of acid equivalent weights of dicarboxylic compound should not be more than about 2.2 acid equivalent weights for each hydroxyl equivalent weight of the castor derivative.

Resin compositions of the invention should also include a catalyst to promote reaction of the acid groups and epoxy groups. A preferred catalyst is a stannous soap of saturated aliphatic acid such as stannous octoate, since the best electrical properties and the best shelf-storage properties are provided with resin compositions including it. Other catalysts can also be used, such as tertiary amines and Lewis acids such as boron trifluoride complexes.

Preferably, epoxy resin and acid-terminated hydrogenated castor derivative are included in the resin composition in a 1:1 ratio of acid equivalent weights and epoxide equivalent weights. At least 0.9 epoxide equivalent weight of epoxy resin should be included for each acid equivalent weight of acid-terminated hydrogenated castor derivative to obtain desirable cured properties. Less flexible cured products, which are desirable for certain applications, may be obtained through the inclusion of excess epoxy resin, though generally not more than about 1.6 epoxide equivalent weights are used for each acid equivalent weight. A curing agent, such as dicarboxylic anhydride, generally is included to cure the excess epoxy resin, in a reactive-group equivalent weight amount slightly less than that of the epoxy resin; or a catalyst can be included to produce homopolymerization of the excess epoxy resin.

Quite often, the epoxy resin, acid-terminated hydrogenated castor derivative, and catalyst are mixed in a coating solution and then impregnated, saturated, or coated on an electrically insulative sheeting. However, prepolymers are sometimes formed before applying the resin composition by a controlled partial prereaction of the epoxy resin and acid-terminated hydrogenated castor derivative. In this way the application of resin composition during the impregnating or coating operations is controlled by giving more body to the composition, and especially for higher molecular weight epoxy resins, increasing the compatability of the ingredients. Further, the time for ultimate curing of the resin compositions — for example, when the tape is applied on the job or, for some tapes of the invention, when the tape is substantially cured during production — is reduced. Typically, substantially equal epoxide equivalent weights and acid equivalent weights of epoxy resin and acid-terminated castor derivative are used in forming the prepolymers, and the ingredients are prereacted until between about approximately 10 percent and 60 percent of the epoxy-acid reactions have occurred.

Preferably the resin compositions in finished tapes of the invention have undergone a partial prereaction of acid and epoxy groups, either through the formation of prepolymers before saturation in the tape as described above or by partial curing after the saturating operation. With the resin composition in this partially prereacted form, a tough, handleable, non-tacky tape is most readily provided. In most cases tape products of the invention may be supplied without a liner, typically wound in a roll.

Another procedure for speeding curing reactions is to form epoxy-terminated adducts of the epoxy resin and acid-terminated hydrogenated castor derivative. These adducts are formed by reacting approximately two epoxide equivalent weights of epoxy resin with each acid equivalent weight of acid-terminated hydrogenated castor derivative in the presence of a catalyst such as potassium acetate. Generally the acid number of the reaction ingredients is reduced to less than 5. A heat-curable resin composition is then formed by mixing the resulting adducts with a curing agent, such as an amine or anhydride curing agent or a catalyst promoting homopolymerization.

The most desirable mica-paper tapes of the invention use two somewhat different resin compositions, and in this way overcome the difficulty of impregnating mica paper. One resin composition, including ingredients of low average molecular weight, is highly fluid so that is it well adapted to impregnating mica paper. In order to conveniently and satisfactorily impregnate mica paper that is substantially 100 percent mica platelets, resin compositions should be used that include ingredients whose original average molecular weight is less than about 1,100; that is the average molecular weight of all the molecules in the resin composition at the time of saturation in the mica paper, including prepolymer molecules, should be less than about 1,100. Resin compositions having somewhat higher molecular weight ingredients are used with mica paper including other materials, such as polyester fibers, that make the paper more porous.

The average molecular weight of the ingredients in the second resin composition in these mica paper tapes is sufficiently high so that the resin composition dries to a non-tacky state. This resin composition is used as an outer coating and provides a non-tacky easily handled surface under normal working conditions. Generally the average molecular weight of the ingredients in the second resin composition is more than about 1,200, and preferably more than about 1,500. For some less preferred tapes of the invention, a resin composition other than one including the acid-terminated ester reaction product of this invention may be applied as the inner impregnating composition; preferably this composition is an epoxy resin composition. In such tape products the inner composition may be fully cured, and the tape a rigid product.

FIG. 1 shows a mica-based paper-glass cloth laminated tape 10 of the invention. The tape includes a sheet of mica-based paper 11 impregnated with a resin composition of the invention. Both sides of the impregnated paper carry a coating 12 of a second resin composition of the invention. A glass cloth 13 is laminated to the impregnated paper by means of one of the layers 12 of the second resin composition, and this layer is impregnated in the cloth.

The invention is further illustrated in the following specific examples; three different acid-terminated hydrogenated castor derivatives are first described, followed by additional, complete examples of tapes of the invention.

ACID-TERMINATED HYDROGENATED CASTOR DERIVATIVE A

The preparation of this compound required the following ingredients:

|  | Parts by Weight |
|---|---|
| Hydrogenated castor oil (hydroxyl equivalent weight 3.56, melting point 188° F. (87° C.), iodine number 3) | 79.8 |
| Succinic anhydride | 20.2 |
| Stannous octoate | 0.1 |

First the hydrogenated castor derivative was charged to a 170-gallon kettle and heated to 280° F (138° C ), whereupon it melted. A stirrer in the kettle was then started and the stannous octoate added to the kettle, after which the succinic anhydride was added slowly. A slight exotherm occurred after the anhydride was added and the kettle was cooled with circulating water so that the temperature did not go above 260° F. (127° C.). The temperature was then held at 250° F. (121° C.) for 2 hours. After this period of time, the acid number was found to be 119. The batch was then cooled to 200° F. (93° C ) and drained into containers. Upon cooling to room temperature, the material solidified as a waxy solid.

ACID-TERMINATED HYDROGENATED CASTOR DERIVATIVE B

The following ingredients were charged to a 2-liter, 3-neck flask under dry nitrogen and heated to 384° F. (196° C.):

Grams

| | |
|---|---|
| Hydrogenated castor derivative used above | 890 |
| Sebacic acid (acid equivalent weight 101.1) | 505.6 |
| p-Toluene sulfonic acid | .140 |

With 100 milliliters of toluene added to aid in removing the water of condensation, the above charge was reacted for about 8 hours at 384° F. (196° C.). The remaining water was then stripped by applying a vacuum until the pressure reached 0.02 millimeters of mercury. While hot, the product of the reaction was a straw-colored fluid; and the product solidified as a semi-solid at room temperature. The acid number was measured at 105.8, and the acid equivalent weight was calculated at 530 grams.

ACID-TERMINATED HYDROGENATED CASTOR DERIVATIVE C

The following ingredients were weighed into a quart jar:

| | Grams |
|---|---|
| Propylene glycol monohydroxy stearate (Paracin 9; hydroxyl equivalent weight 194, melting point 127° F. (53° C.), iodine number 4) | 194 |
| Succinic anhydride | 100 |
| Stannous octoate | 0.3 |

The ingredients were thoroughly dry mixed in the jar and then heated to 250° F. (121° C.). The mixture was held at this temperature for 2 hours with frequent shaking of the jar. At the end of this time, the mixture had reacted and was a clear amber liquid; and upon cooling, the mixture solidified as a soft wax. The acid number was measure as 208 and the acid-gram-equivalent weight was calculated at 270 grams.

EXAMPLE 1

In this example an insulating tape of resin-impregnated and resin-coated mica-based paper was made. The specific mica-based paper used in this example contained 70 percent reconstituted mica and was unified by nonwoven polyester fiber introduced during preparation of the paper on a Fourdrinier machine. The resulting paper sheet had then been further bonded to lineally aligned polyester filaments (about 10 per inch) for added strength. The paper was 7–8 mils in thickness and was porous.

Two different electrically insulative heat-curable resin compositions were used in preparing the insulating tape of this example. Both resin compositions included the acid-terminated hydrogenated castor derivative A described above in addition to an epoxy resin. The first resin composition included a polyglycidyl ether of bisphenol A having an epoxide equivalent weight of approximately 190 (Epon 828). The second resin composition also included a polyglycidyl ether of bisphenol A but this epoxy resin had an epoxide equivalent weight of approximately 950 (Epon 1004). Both resin compositions also included stannous octoate as a curing agent.

To facilitate processing, the epoxy resin and acid-terminated castor derivative were prereacted to form prepolymers. The prepolymer of the first resin composition included:

| | Parts |
|---|---|
| Epoxy resin (Epon 828) | 17.3 |
| Acid-terminated castor derivative A | 42.7 |
| Methyl ethyl ketone | 20.0 |
| Toluene | 20.0 |

The prepolymer of the second resin composition included:

| | |
|---|---|
| Epoxy resin (Epon 1004) | 33.34 |
| Acid-terminated castor derivative A | 16.66 |
| Toluene | 35.0 |
| Methyl isobutyl ketone | 15.0 |

In preparing each of these prepolymers, the acid-terminated hydrogenated castor derivative was melted in a stainless steel kettle by heating it to about 250° F. (121° C.). The epoxy resin was then added slowly until all was charged, and the mixture was reacted for about 2 ½ hours at this temperature and then cooled to 200° F. (94° C.). After this period of time, the solvents were added, and the acid number of the resulting 60 percent solids solution of the first prepolymer was 32.1, and the acid number of the 50 percent solids solution of the second prepolymer was 40.7.

The mica paper described above was dipped in a continuous process into the first prepolymer, which had been further diluted with methyl ethyl ketone to a 30 percent solids solution and catalyzed with 0.2 parts per hundred of resin of stannous octoate. The solvent was removed by passing the dipped tape through a vertical tower oven having three heating zones. The tape was in each zone for approximately 1 ¾ minutes, with the first zone being at a temperature of 180° F., the second zone at 235° F., and the third zone at 255° F. At this point, the resin accounted for 31.5 percent of the total weight of the paper and the resin.

This resin-coated paper was then coated by passage through a dip tank containing the second prepolymer further diluted to a 30 percent solids solution with methyl ethyl ketone. After passage through the dip tank, the coated paper was dried in a vertical tower oven using the same times and temperatures as after the first coating operation. At this point, the resin-coated paper had a caliper of 9.5 mils, the total resin content was 52 weight percent, the resin was cured to B-stage, and the outside surfaces of the tape were quite smooth and non-tacky. The tape was then wound into a jumbo roll using 3-mil polyethylene film as a separator between the convolutions.

The finished tape was tested and found to include 0.45 percent volatiles (when heated 15 minutes at 300° F. (149° C.)) and had a Gurley stiffness of 1,000 miligrams. One-inch strips of the tape were spirally wrapped with overlapping of half tape width on a ½ inch by ¾ inch aluminum bar to a thickness of 6 layers of tape. After being heated 2 hours at 356° F. (180° C.) the resin on the tape had flowed to fill in the seams, and the resin was well cured to a semi-flexible state. The bond between layers was good.

A sheet of the tape of this example cured for two hours at 356° F (180° C.) exhibited a dielectric strength of 850 volts per mil and had 1.84 percent by weight extractibles in acetone (when soaked for 24 hours and then dried 30 minutes at 250° F (121° C.)). Using a voltage impressed at 100 cycles per second, this cured tape exhibited the following dissipation factor and dielectric constant:

| | 73° F. (23° C.) | 140° F. (60° C.) | 194° F. (90° C.) | 221° F. (105° C.) | 266° F. (130° C.) | 311° F. (155° C.) | 356° F. (180° C.) |
|---|---|---|---|---|---|---|---|
| Dissipation factor | 0.017 | 0.021 | 0.027 | 0.035 | 0.124 | 0.257 | 0.326 |
| Dielectric constant | 2.32 | 2.53 | 2.56 | 2.53 | 2.58 | 2.99 | 3.39 |

Two 4-inch by 6-inch sheets of the tape of this invention were cured two hours at 356° F. (180° C.). These cured sheets were then placed in a pressure cooker containing water and kept there 24 hours while the temperature inside the cooker was maintained at 240° F. (116° C). After this treatment the sheets were removed and found to be somewhat softer and more pliable, but the mica paper was still bonded together well and there was no evidence of tackiness or other signs of resin degradation. The water absorption was low and approximated 3 percent. The sheet was then dried 24 hours at 150° F. (66° C.) and then 16 hours at 311° F. (155° C.). The tape had returned to its original physical properties and its dielectric strength was equivalent to the original value.

EXAMPLE 2

A mixture of 315 parts by weight of a polyglycidyl ether of bisphenol A having an epoxide equivalent weight of about 315 and a Durran's softening point of 104° F–113° F. (40° C.–45° C.) (Epon 836), 460 parts of the acid-terminated hydrogenated castor derivative A, and 1.55 parts of stannous octoate catalyst were prepared as a 50 percent solids solution in methyl ethyl ketone. This solution was applied to one surface of 4-mil reconstituted mica paper with a paint brush. The solution was allowed to penetrate for about 3 minutes and then the excess blotted off. This tape was then dried 15 minutes at 200° F. (93° C.) and precured 2 ½ minutes at 400° F. (204° C.). At this point the resin-impregnated mica paper was fairly transparent and was quite flexible and strong enough to be handleable. The resin accounted for 37 weight percent of the resin and paper.

Next a 2-mil woven glass cloth (Style 108) was bonded to the impregnated mica paper by laying the glass cloth over the saturated paper and brushing on a small amount of prepolymer. This prepolymer had been prepared in the same manner as the prepolymers of Example 1 using a polyglycidyl ether of bisphenol A having an epoxide equivalent weight of approximately 625 and a Durran's softening point of 167° F–185° F. (75° C.–85° C.) (such as Epon 1002). About 25.4 parts of acid-terminated wax A were used for 34.5 parts of epoxy resin. The prepolymer prepared had an acid number of 40.7. This prepolymer was dissolved, after cooling, in an approximately 2:1 mixture of toluene and methyl isobutyl ketone to give a 60 percent solids solution.

The resin-coated composite of glass cloth and mica paper was dried for 10 minutes at 200° F (93° C.) and 3 minutes at 300° F. (149° C.). The resin then accounted for 42.5 weight percent of the whole composite. One-inch strips of this tape were wrapped around a 1-inch diameter core. There was no evidence of blocking after 3 days at room temperature. The tape had good flexibility and was easy to wrap around ½ inch by ¾ inch coil sections. When cured for 2 hours at 356° F. (180° C), wrappings exhibited good resin flow out and bonding.

A flat sheet was cured for 2 hours at 356° F. (180° C.) and the following properties measured:

| | |
|---|---|
| Caliper, mils | 10 |
| Percent extractibles in acetone (when soaked 24 hours and dried 30 minutes at 250° F.) | 1.07 |
| Dielectric strength, volts/mil | 1,000 |
| Gurley stiffness, milligrams | 5,300 (which indicates good flexibility) |
| Dielectric constant (100 cycles/ second at 155° C.) | 2.63 |
| Dissipation factor (100 cycles/ second at 155° C.) | 0.072 |

EXAMPLE 3

A resin-impregnated bondable tape was prepared using 6-mil nonwoven polyester fiber web reinforced with lineally aligned polyester filaments. This web was first coated with the following resin solution:

| | Parts by Weight |
|---|---|
| Acid-terminated hydrogenated castor derivative A | 450 |
| 3,4-epoxycylohexylmethyl-3,4-epoxycyclohexanecarboxylate (having an epoxide equivalent weight of about 135 and a viscosity of about 500 centipoises at 24° C.) (ERL-4221) | 255 |
| Stannous octoate | 11.4 |
| Toluene | 180 |

The polyester web was saturated by dipping it in the resin solution and the excess resin removed by knives while the web was traveling up into a vertical oven. The coated web was dried for about 2 minutes at 220° F. (104° C.) and then the resin was cured by passage of the coated web for about 2 minutes in each of two zones of the oven having temperatures of 250° F. (121° C.) and 300° F (149° C.), respectively. On emerging from the oven the resin had cured to a non-tacky, non-fusible, flexible state. The web thickness was about 7.25 mils.

The coated polyester web was then further coated by dipping one side of the web in the solution of the prepolymer described in Example 2 to which was added 0.198 parts by weight of stannous octoate for each 100 parts of the solution. The excess of solution was removed by knives and the coated web dried in the three zones of a vertical tower oven, each zone being heated to 220° F. (104° C.), 300° F. (149° C.), and 300° F. (149° C.), respectively, for a time to advance the latter coat of resin only slightly. At room temperature the latter coating was non-tacky and well anchored to the previous resin coat. The caliper of the finished tape was 9.5 mils.

Wrappings of this tape were made and cured 4 hours at 300° F. (149° C.). After this time, the wrappings were so well bonded that they could not be separated. A flat sheet of the tape was cured under the same conditions, and the dielectric strength was measured at about 75 volts per mil. The dissipation factor and dielectric constant were measured using a voltage impressed at 100 cycles per second and while the tape was heated to 155° C. as 0.24 and 5.95, respectively,

EXAMPLE 4

In this example a tape having a cured, resin-impregnated glass cloth backing was prepared. The resin composition in the cloth included an epoxy-terminated hydrogenated castor derivative adduct. This adduct was prepared in a 2-liter 3-neck flask under dry nitrogen. First of all, acid-terminated hydrogenated castor derivative (like the acid-terminated hydrogenated castor derivative A except that it was made without using stannous octoate) in an amount of 491.6 grams was melted in the flask at a temperature of about 212° F. (100° C.). Next, 390 grams of a polyglycidyl ether of bisphenol A (Epon 828), 0.10 grams of potassium acetate, and 98 grams of toluene were added. The mixture was then brought to a reflux condition at a temperature of 305° F. (152° C.). After 6 ½ hours, the batch was cooled to about 212° F. (100° C.), and toluene was added to produce an 80 percent solids solution. The acid number of this solution was 0.4.

A coating solution was next prepared with the following ingredients:

| | Parts by Weight |
|---|---|
| Adduct described | 700 |
| Methylene dianiline (50% solution in methyl ethyl ketone) | 62.8 |
| Stannous octoate | 6.0 |
| Toluene | 136.5 |
| Methyl ethyl ketone | 100.5 |

The glass cloth used was a 2-mil thick, woven glass cloth (Style 108), and it was dipped in the above solution, with the excess being removed by offset knives with an orifice of 6 mils. The coated cloth was then dried in a vertical tower oven for about 4 minutes at 200° F. (93° C.) and then cured for about 8 minutes at 300° F. (149° C.). The cured resin-coated cloth was quite smooth, non-tacky, and very flexible. Measured at 1352 C. the 100 cycles per second dielectric constant was 4.03 and the dissipation factor was 0.23. The di-electric strength was 7,200 volts. This coated cloth was exposed in contact with a shiny copper bar for 5 days at 215° F. (102° C.) at 100 percent relative humidity, but there was no sign of copper corrosion and the resin-coated cloth remained very flexible with no sign of deterioration or stickiness. This backing also showed good heat stability. After 60 days at 302° F. (150° C.), there was only 11.2 percent weight loss and the flexibility was still good.

EXAMPLE 5

The acid-terminated hydrogenated castor derivative B was combined with epoxy resin as follows:

| | Parts by Weight |
|---|---|
| Acid-terminated hydrogenated castor derivative B | 530.0 |
| Polyglycidyl ether of bisphenol A (Epon 836) as a 60% solids solution in methyl ethyl ketone | 525.0 |
| Stannous octoate | 8.5 |
| Methyl ethyl ketone | 356.5 |

This solution was knife coated into 2-mil thick, woven glass cloth (Style 108) using a 15-mil orifice. The coated cloth was then dried 5 minutes at 200° F. (93° C.) and cured 2 hours at 300° F. (149° C.), whereupon the cured resin was tough and very flexible. The heat aging resistance of this resin-coated tape was very good — after 1 week at 356° F. (180° C.), the weight loss was only 9.1 percent, and after 6 months at 356° F. (180° C.), the tape was still flexible and could be creased 180° without cracking. The hydrolysis resistance was measured by enclosing a sample of the tape in a brass bomb with a small amount of water present. After exposure to 235° F. (113° C.) for 24 hours, the sample appeared unaffected. The resin coating was still very flexible and the surface was not sticky. The dielectric properties were also excellent.

| | 73° F. (23° C.) | 140° F. (60° C.) | 194° F. (90° C.) | 266° F. (130° C.) | 311° F. (155° C.) | 356° F. (180° C.) |
|---|---|---|---|---|---|---|
| Dissipation factor (100 cycles/second) | 0.019 | 0.012 | 0.014 | 0.022 | 0.133 | 0.385 |
| Dielectric constant (100 cycles/second) | 4.20 | 4.12 | 4.18 | 3.27 | 3.51 | 3.72 |
| Volume resistivity (ohm-centimeters) | $2 \times 10^{14}$ | $7 \times 10^{13}$ | $2 \times 10^{12}$ | $4 \times 10^{11}$ | $2 \times 10^{11}$ | $6 \times 10^{10}$ |

EXAMPLE 6

Two-mil thick woven, glass cloth (Style 108) was knife coated, using a 8-mil orifice, with the following resin solution:

| | Parts by Weight |
|---|---|
| Acid-terminated hydrogenated castor derivative C | 294 |
| Polyglycidyl ether of bisphenol A (Epon 828) | 190 |
| Stannous octoate | 7.3 |
| Toluene | 325 |

The coated cloth was dried 30 minutes at 200° F. (93° C.) and then cured 30 minutes at 400° F. (204° C.). The resulting 4-mil coated cloth was smooth, non-tacky, and very flexible. Some test results were:

| | |
|---|---|
| Percent extractibles in acetone (when soaked 24 hours and then dried 30 minutes at 250° F. (121° C.)) | 1.1 |
| Hydrolysis resistance (placed for 24 hours in brass bombs with water and heated at 235°F. (113° C.)) | no noticeable effect and tape did not become tacky |
| Heat aging at 356° F. (180° C.) Weight loss after 7 days, percent | 7.4 |
| Flexibility after 7 days | very good |
| Dielectric strength, volts/mil | 1,850 |
| Dielectric constant (100 cycles/second at 311° F. (155° C.)) | 2.83 |
| Dissipation factor (100 cycles/second at 311° F. (155° C.)) | 0.101 |

What is claimed is:

1. Tough handleable electrically insulative tape that is highly resistant to a combination of environmental conditions including high temperature and moisture and which comprises self-supporting flexible electrically insulative sheeting carrying a thin layer of an electrically insulative heat-curing resin composition that comprises
   1. an epoxy resin having more than 1.3 oxirane groups on the average per molecule;
   2. the acid-terminated ester reaction product of
      a) a hydrogenated castor derivative having an iodine number of about 40 or less and
      b) a dicarboxylic compound selected from dicarboxylic acid anhydrides and dicarboxylic acids,
      the reaction product including between about 1.7 and 2.2 acid-equivalent weights of dicarboxylic compound for each hydroxyl equivalent weight of hydrogenated castor derivative; and
   3. a catalyst that promotes reaction of the epoxy resin and acid-terminated reaction product,
      the average molecular weight of the epoxy resin and acid-terminated ester reaction product being high so that the layer of resin composition is nontacky.

2. A tape of claim 1 in which the resin composition is partially reacted.

3. A tape of claim 1 in which the hydrogenated castor derivative is hydrogenated castor oil.

4. A tape of claim in which the resin composition includes an epoxy-terminated adduct formed by prereacting approximately two epoxide equivalent weights of the epoxy resin with approximately one acid equivalent weight of the acid-terminated ester reaction product.

5. A tape of claim 1 in which the electrically insulative sheeting is a mica-based sheeting.

6. Tough handleable resin-impregnated electrically insulative tape that is highly resistant to a combination of environmental conditions including high temperature and moisture and which comprises
   A. self-supporting flexible electrically insulative mica-based sheeting impregnated with a first heat-curing resin composition that comprises
      1. an epoxy resin having more than 1.3 oxirane groups on the average per molecule; and
      2. a curing agent for crosslinking the epoxy resin; the average molecular weight of the ingredients being low so that the resin composition is adapted to impregnate mica paper; and
   B. on at least one surface of the impregnated mica-based sheeting a fibrous web impregnated and laminated to the sheeting with a second heat-curing partially reacted resin composition that comprises
      1. an epoxy resin having more than 1.3 oxirane groups on the average per molecule;
      2. the acid-terminated ester reaction product of
         a. a hydrogenated castor derivative having an iodine number of about 40 or less, and
         b. a dicarboxylic compound selected from dicarboxylic acid anhydrides and dicarboxylic acids,
         the reaction product including between about 1.7 and 2.2 acid-equivalent weights of dicarboxylic compound for each hydroxyl equivalent weight of hydrogenated castor derivative; and
      3. a catalyst that promotes reaction of the epoxy resin and acid-terminated reaction product, the average molecular weight of the epoxy resin and acid-terminated ester reaction product being high so that the second resin composition is in a nontacky form.

7. The tape of claim 6 in which the fibrous web is a glass-fiber cloth.

8. The tape of claim 6 in which the hydrogenated castor derivative is hydrogenated castor oil.

9. A tape of claim 6 in which the first resin composition comprises
   1. an epoxy resin having more than 1.3 oxirane groups on the average per molecule;
   2. the acid-terminated ester reaction product of
      a. a hydrogenated castor derivative having an iodine number of about 40 or less and
      b. a dicarboxylic compound selected from dicarboxylic acid anhydrides and dicarboxylic acids,
      the reaction product including between about 1.7 and 2.2 acid-equivalent weights of dicarboxylic compound for each hydroxyl equivalent weight of hydrogenated castor derivative; and
   3. a catalyst that promotes reaction of the epoxy resin and acid-terminated reaction product,
      the average molecular weight of the epoxy resin and acid-terminated ester reaction product being low so that the resin composition is highly fluid and adapted to impregnate mica paper.

* * * * *